(12) United States Patent
Wang

(10) Patent No.: US 12,047,996 B2
(45) Date of Patent: Jul. 23, 2024

(54) SCHEDULING INFORMATION FOR TRANSMISSION

(71) Applicant: Telefonaktiebolaget LM Ericsson (publ), Stockholm (SE)

(72) Inventor: Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 396 days.

(21) Appl. No.: 17/607,139

(22) PCT Filed: Apr. 29, 2020

(86) PCT No.: PCT/EP2020/061968
§ 371 (c)(1),
(2) Date: Oct. 28, 2021

(87) PCT Pub. No.: WO2020/221837
PCT Pub. Date: Nov. 5, 2020

(65) Prior Publication Data
US 2022/0217737 A1    Jul. 7, 2022

Related U.S. Application Data

(60) Provisional application No. 62/840,507, filed on Apr. 30, 2019.

(51) Int. Cl.
*H04W 72/04* (2023.01)
*H04L 5/00* (2006.01)
(Continued)

(52) U.S. Cl.
CPC ......... *H04W 72/569* (2023.01); *H04L 5/0053* (2013.01); *H04L 5/0078* (2013.01); *H04W 74/0808* (2013.01)

(58) Field of Classification Search
CPC ........... H04W 72/569; H04W 74/0808; H04W 72/23; H04W 72/0446; H04W 72/1268;
(Continued)

(56) References Cited

U.S. PATENT DOCUMENTS

2017/0171907 A1* 6/2017 Agarwal .......... H04W 52/0219
2017/0289992 A1* 10/2017 Sun ..................... H04W 72/21
(Continued)

FOREIGN PATENT DOCUMENTS

WO    2019030726 A1    2/2019

OTHER PUBLICATIONS

Vivo, "Remaining issues on UL data transmission for URLLC", 3GPP TSG RAN WG1 Meeting #92bis, R1-1806070, Busan, Korea, May 21-25, 2018, 1-5 (Year: 2018).*

(Continued)

*Primary Examiner* — Lan-Huong Truong
(74) *Attorney, Agent, or Firm* — Murphy, Bilak & Homiller, PLLC

(57) ABSTRACT

In an example, a method, performed by a first wireless communications device, of scheduling information for transmission in at least one of a plurality of time periods allocated for a transmission occasion of a channel is disclosed. The method comprises scheduling first information for transmission in a first time period of the plurality of time periods, and scheduling second information or no information for transmission in a second time period of the plurality of time periods, wherein the first time period is later in time than the second time period, and the first information has a higher priority and/or a lower latency requirement than the second information.

19 Claims, 13 Drawing Sheets

(51) Int. Cl.
*H04W 72/566* (2023.01)
*H04W 74/0808* (2024.01)

(58) Field of Classification Search
CPC ... H04L 5/0053; H04L 5/0078; H04L 5/0055; H04L 5/0007; H04L 5/0057
See application file for complete search history.

(56) References Cited

U.S. PATENT DOCUMENTS

2018/0279358 A1* 9/2018 Babaei .............. H04W 72/0453
2018/0324768 A1 11/2018 Shaheen et al.
2019/0334688 A1* 10/2019 Kwak ................. H04W 72/23

OTHER PUBLICATIONS

3GPP, "3rd Generation Partnership Project; Technical Specification Group Radio Access Network; Study on NR-based access to unlicensed spectrum (Release 16)", 3GPP TR 38.889 V16.0.0, Dec. 2018, 1-119.
Vivo, "Remaining issues on UL data transmission for URLLC", 3GPP TSG RAN WG1 Meeting #92bis, R1-1806070, Busan, Korea, May 21-25, 2018, 1-5.

* cited by examiner

SCHEDULING INFORMATION FOR TRANSMISSION

TECHNICAL FIELD

Examples of the present disclosure relate to scheduling information for transmission.

BACKGROUND

Currently the 5th generation cellular wireless communication system, called New Radio (NR), is being standardized in 3GPP. NR is developed for maximum flexibility to support multiple and substantially different use cases. Besides the typical mobile broadband use case, use cases may also include machine type communication (MTC), ultra-low latency critical communications (ULLCC), Ultra Reliable Low Latency Communications (URLLC), side-link device-to-device (D2D) and several other use cases too.

In NR, the basic scheduling unit is called a slot. A slot consists of 14 OFDM symbols for the normal cyclic prefix configuration. NR supports many different subcarrier spacing configurations (numerologies) and, in an example, at a subcarrier spacing of 30 kHz the OFDM symbol duration is ~33 us. As an example, a slot with 14 symbols for the same subcarrier spacing (SCS) is 500 us long (including cyclic prefixes).

NR is targeting both licensed and unlicensed bands, including a work item named NR-based Access to Unlicensed Spectrum (NR-U). Allowing unlicensed networks, i.e., networks that operate in shared spectrum (or unlicensed spectrum), to effectively use the available spectrum is an attractive approach to increase system capacity. Although unlicensed spectrum may not match the qualities of licensed spectrum in some cases, solutions that allow an efficient use of unlicensed spectrum as a complement to licensed deployments have the potential to bring value to 3GPP operators and ultimately, to the 3GPP industry as a whole.

When operating in unlicensed spectrum, a common requirement is for the device to sense the medium as free before transmitting. This operation may be referred to as listen before talk (LBT). There are many different versions of LBT, depending on which radio technology a device uses and the type of data the device wants to transmit. However, what is shared amongst different version of LBT is that the sensing is done in a particular channel (corresponding to a defined carrier frequency) and over a predefined bandwidth. For example, in the 5 GHz band, the sensing is done over 20 MHz channels.

Many devices are capable of transmitting (and receiving) over a wide bandwidth including multiple sub-bands/channels, e.g., LBT sub-band (i.e., the frequency part with bandwidth equal to LBT bandwidth). A device is only allowed to transmit on the sub-bands where the medium is sensed as free. Again, there are different versions of how the sensing should be done when multiple sub-bands are involved.

Listen-before-talk (LBT) is designed at least in part for unlicensed spectrum co-existence with other RATs. In this mechanism, in some examples, a radio device applies a clear channel assessment (CCA) check (i.e. channel sensing) before any transmission. During CCA, the transmitter performs energy detection (ED) over a time period compared to a certain threshold (ED threshold) in order to determine if a channel is idle. In case the channel is determined to be occupied, the transmitter performs a random back-off within a contention window before the next CCA attempt. In order to protect ACK transmissions, the transmitter defers a period after each busy CCA slot prior to resuming back-off. As soon as the transmitter has gained access to a channel, the transmitter is only allowed to perform transmission up to a maximum time duration (namely, the maximum channel occupancy time (MCOT)). For quality of service (QoS) differentiation, a channel access priority based on the service type has been defined. For example, there are four LBT priority classes defined for differentiation of contention window sizes (CWS) and MCOT between services.

According to RAN1 agreements within 3GPP (e.g. as outlined in TR38.881, V16.0.0), multi-TTI (multi-transmission time interval) grants for physical uplink shared channel (PUSCH) have been agreed to be introduced for NR-U. A summary of the agreements from TR38.889 are provided below:

TR38.889 [1]: scheduling multiple TTIs for PUSCH each using a separate UL grant in the same PDCCH monitoring occasion is identified as beneficial. Scheduling multiple TTIs for PUSCH, i.e., scheduling multiple TBs with different HARQ process IDs over multiple slots, using a single UL grant, is identified as beneficial and should be supported in NR-U.

Agreement from RAN1 #95: the previous agreement on multi-TTI scheduling implies that NR-U should at least support scheduling multiple TBs with different HARQ process IDs in multiple slots using a single UL grant.

Agreement from RAN1 #96: Scheduling PUSCH over multiple slots/mini-slots by single DCI supports at least multiple continuous PUSCHs with separate TBs.

Each TB is mapped to at most one slot or one mini-slot

To enable more LBT opportunities for the UE, it has also been discussed that it may also be beneficial for the multi-TTI grant to support mini-slot type grant at the beginning which switches to full slot grant at slot boundaries. This has been discussed in RAN1. An example of how the multi-TTI grant would operate with LBT and with mix of mini-slots and full slots is shown in FIG. 1, which shows examples of operation with multi-TTI grants.

From FIG. 1, it is observed that:
1) Multi-TTI grant with a mix of mini-slots and full slots can give more scheduling opportunities to overcome LBT failures.
2) As soon as the user equipment (UE) occupies the channel after successful LBT operation, the UE can perform continuous transmissions without LBT operations.

Please note that multi-TTI grant means—in some examples—a set of grants for PUSCH transmissions with full slots, mini-slots or mixed full slots and mini-slots if there is no special description.

A multi-TTI grant may in some examples comprise a plurality of time periods, e.g. slots, mini-slots and/or TT's (transmission time intervals), which may in some examples be consecutive or contiguous. The multi-TTI grant may in some examples be granted (e.g. by a base station, eNB, gNB etc) to a wireless communications device (e.g. UE) in a single operation, e.g. a single communication from the base station to the UE.

As shown in FIG. 1, for example, the UE may receive a single downlink control information (DCI) indicating multiple continuous PUSCHs with separate transport blocks (TBs). In some examples, the multi-TTI grant, or a grant of multiple time periods e.g. in a single downlink control information (DCI), may be referred to as a transmission occasion.

The provision of multi-TTI grants can present certain challenges. The UE may experience LBT failures during the first one or more TT's/slots/mini-slots within a multi-TTI period. If those corresponding transport block (TBs) carry critical uplink (UL) data (e.g. data or information with low latency requirement and/or high priority), such as media access control control element (MAC CE), radio resource control (RRC) signaling, or uplink control information (UCI), those data would then be delayed, since those TBs would rely on retransmissions to reach the gNB. However, the retransmission opportunities may be granted by the gNB via next multi-TTI grant if there is no available retransmission opportunities in the current multi-TTI period.

SUMMARY

Certain aspects of the present disclosure and their embodiments may provide solutions to these or other challenges. One aspect of the present disclosure provides a method performed by a first wireless communications device of scheduling information for transmission in at least one of a plurality of time periods allocated for a transmission occasion of a channel. The method comprises scheduling first information for transmission in a first time period of the plurality of time periods, and scheduling second information or no information for transmission in a second time period of the plurality of time periods, wherein the first time period is later in time than the second time period, and the first information has a higher priority and/or a lower latency requirement than the second information.

Another aspect of the present disclosure provides apparatus in a first wireless communications device for scheduling information for transmission in at least one of a plurality of time periods allocated for a transmission occasion of a channel. The apparatus comprises a processor and a memory. The memory contains instructions executable by the processor such that the apparatus is operable to schedule first information for transmission in a first time period of the plurality of time periods, and schedule second information or no information for transmission in a second time period of the plurality of time periods, wherein the first time period is later in time than the second time period, and the first information has a higher priority and/or a lower latency requirement than the second information.

A further aspect of the present disclosure provides apparatus in a first wireless communications device for scheduling information for transmission in at least one of a plurality of time periods allocated for a transmission occasion of a channel. The apparatus is configured to schedule first information for transmission in a first time period of the plurality of time periods, and schedule second information or no information for transmission in a second time period of the plurality of time periods, wherein the first time period is later in time than the second time period, and the first information has a higher priority and/or a lower latency requirement than the second information.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
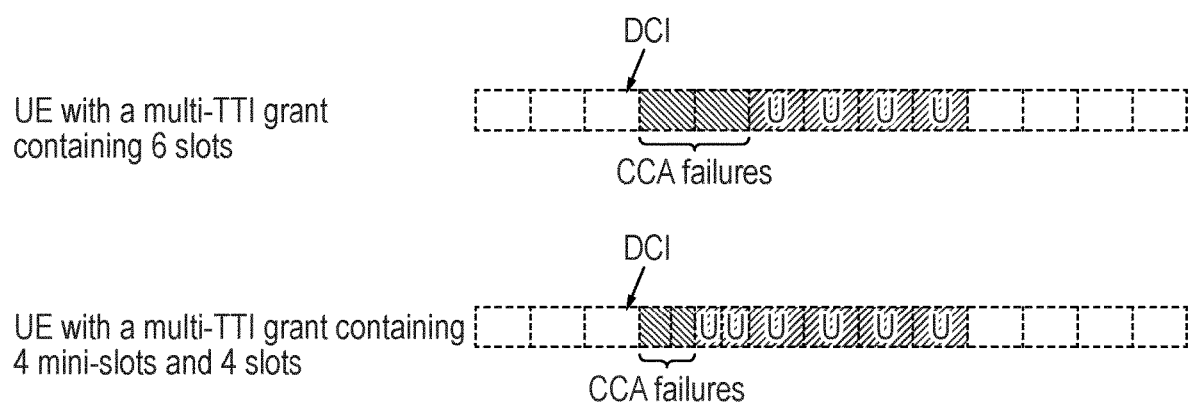
FIG. 1 shows examples of operation of multi-TTI grants.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analogue and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing the techniques described herein.

As introduced above, it has been appreciated that the provision of multi-TTI grants can present challenges if the UE is subject to LBT failures, particularly if those LBT failures occur during transmission intervals of a multi-TTI period carrying critical UL data (e.g. data with a low latency requirement and/or high priority data). Two examples of this problem are illustrated in FIGS. 2 and 3.

Figure 2:
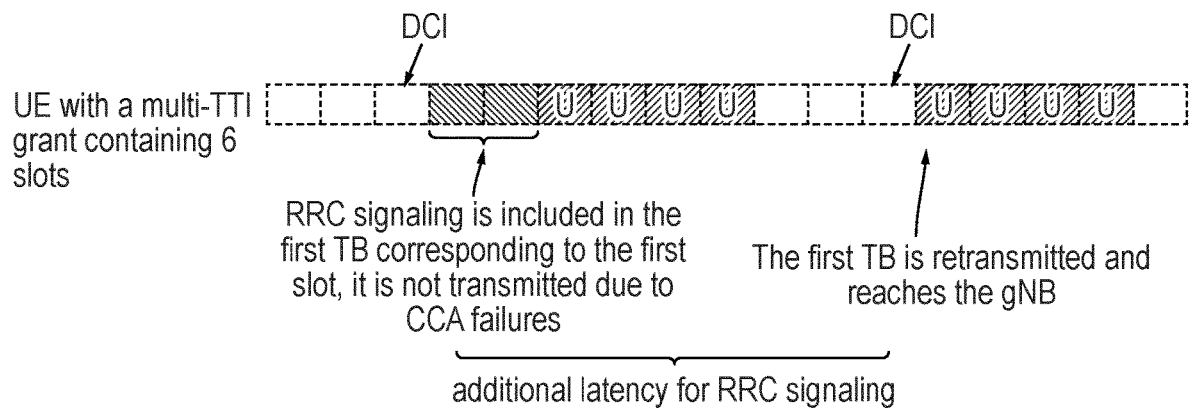
FIG. 2, which shows an example of RRC signaling being delayed due to LBT failures.

In the first example shown in FIG. 2, which shows an example of RRC signaling being delayed due to LBT failures, there is RRC signaling in the UE buffer when the UE receives a multi-TTI grant indicating six consecutive slots which don't contain any hybrid automatic repeat request (HARQ) retransmission occasion. The RRC signaling might for example be included in the first TB due to its highest logical channel (LCH) priority, while the other LCHs with lower LCH priorities would be included in subsequent TBs (later in time in the transmission occasion). In this example, the UE experiences LBT failures for the first two slots, and the UE would not be able to transmit the first two TBs. Both TBs may be retransmitted in the next multi-TTI period (e.g. next transmission occasion), which inevitably incurs latency for delivery of the RRC signaling.

Figure 3:
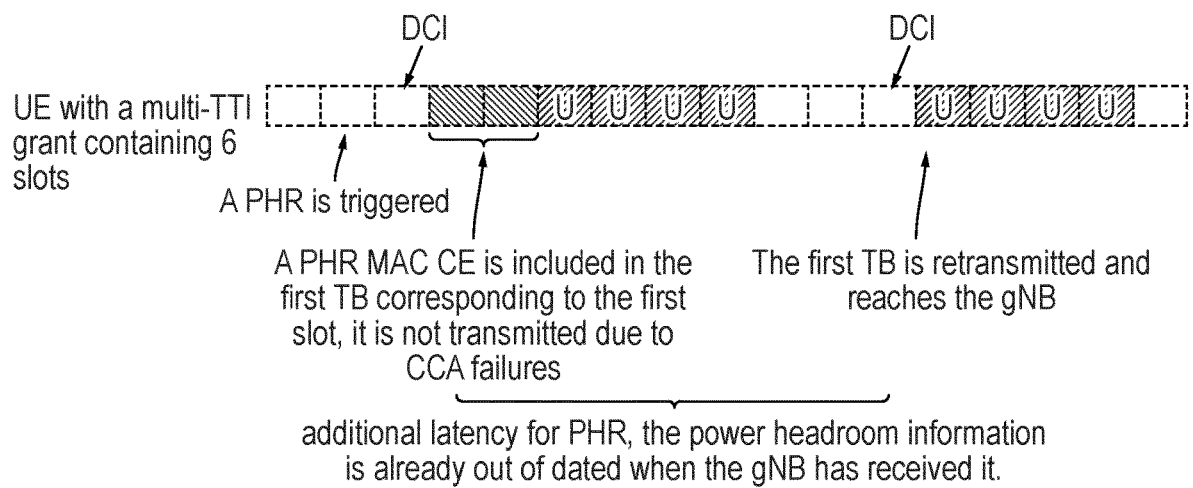
FIG. 3 shows an example of a Power Headroom Report (PHR) being delayed due to LBT failures.

In the second example shown in FIG. 3, which shows an example of a Power Headroom Report (PHR) being delayed due to LBT failures, there is a PHR MAC control element (CE) triggered prior to reception of a multi-TTI grant indicating 6 consecutive slots which don't contain any HARQ retransmission occasion. The PHR MAC CE may be included in the first TB due to its higher LCH priority than other LCHs with data. In this example, the UE experiences LBT failures for the first two slots, and the UE would not be able to transmit the first two TBs. Both TBs may be retransmitted in the next multi-TTI period (e.g. next transmission occasion), which inevitably incurs latency for delivery of the PHR MAC CE.

3GPP RAN2 agreements made in RAN2 #105 bis indicate the content of a MAC PDU (including any PHR value) will not change after it has been built for transmission on dynamic grant, even if the LBT fails. In the context of this example, the PHR content in the first TB will therefore not be updated for any retransmission. Thus, in addition to the increased latency of transmitting the PHR content in the event of an LBT failure, the PHR information in the first TB may be out of date when the gNB receives the PHR MAC CE. This may lead to problems such as for example an incorrect or inaccurate decision made by the gNB for scheduling and link adaptation of new data.

According to embodiments disclosed herein, while receiving or having received a grant or allocation of a transmission occasion (herein used interchangeably with multi-TTI grant), the UE doesn't transmit, or schedule for transmission, UL data with critical QoS requirements such as RRC signalling, LCHs with high priority levels, URLLC data, high priority MAC CE (BSR MAC CE, PHR MAC CE, C-RNTI MAC CE etc), UCI, in time slots (e.g. TBs) corresponding to earlier slots/mini-slots of the multi-TTI period. Instead, the UE includes those critical UL data in later slots/mini-slots within the multi-TTI period.

As an example, if a QoS requirement, if any, allows it, critical UL data may be included in the last time period or TTI (e.g. a slot or a mini-slot) of the multi-TTI period. As another example, if the UE receives a multi-TTI grant with mix of mini-slots and full slots and, if a QoS requirement (if any) allows it, critical UL data may be included in the last mini-slot of the multi-TTI period. As another example, the gNB configures a slot/occasion within the multi-TTI period for any critical UL data, indicating that the critical UL data need to be transmitted by the UE no later than that slot. The configuration may be signalled in an RRC signalling, a MAC CE, or downlink control information (DCI).

Generally, according to embodiments of this disclosure, a method of scheduling information for transmission and/or transmitting the information is provided. The information may have a low latency requirement (e.g. it is mandated or desirable for the information to be successfully received by a recipient with a short latency), and/or a high priority. Examples of such information may include one or more of a Radio Resource Control (RRC) signalling, Logical Channel (LCH) with high priority level and/or short latency requirement, Ultra Reliable Low Latency Communications (URLLC) data, high priority Media Access Control (MAC) Control Element (CE), Buffer Status Report (BSR) MAC CE, Power Headroom Report (PHR) MAC CE, Cell Radio Network Temporary Identifier (C-RNTI) MAC CE, Uplink Control Information (UCI). The information may be scheduled and/or transmitted by a wireless communications device (e.g. base station, user equipment, or other wireless communications device) in a time period that is not the first time period in a transmission occasion (e.g. a plurality of allocated or granted time periods, which may or may not be consecutive or contiguous). Instead, the information may be scheduled or transmitted in a later time period of the transmission occasion, e.g. a latest time period, a latest time period of a particular type (e.g. latest time slot or latest mini-slot), a time period in a later portion of the transmission occasion (where the portion comprises e.g. certain predetermined time periods, such as for example a latest proportion such as latest half of the time periods). In some examples, in time periods earlier than that which contains the information, no information may be scheduled or transmitted (e.g. no transmissions at all, or padding data), or other information of a lower priority and/or higher latency requirement may be scheduled or transmitted.

Any of the embodiments disclosed herein may be applied between a first wireless communications device and a second wireless communications device, where appropriate. A wireless communications device may comprise a base station, eNB, gNB, UE, or any other wireless communications device.

Certain embodiments may provide one or more of the following technical advantage(s) of increasing opportunities for a wireless device such as a UE to transmit critical UL data with improved reliability and/or latency to overcome potential LBT failures in the case of multi-TTI scheduling.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 4:
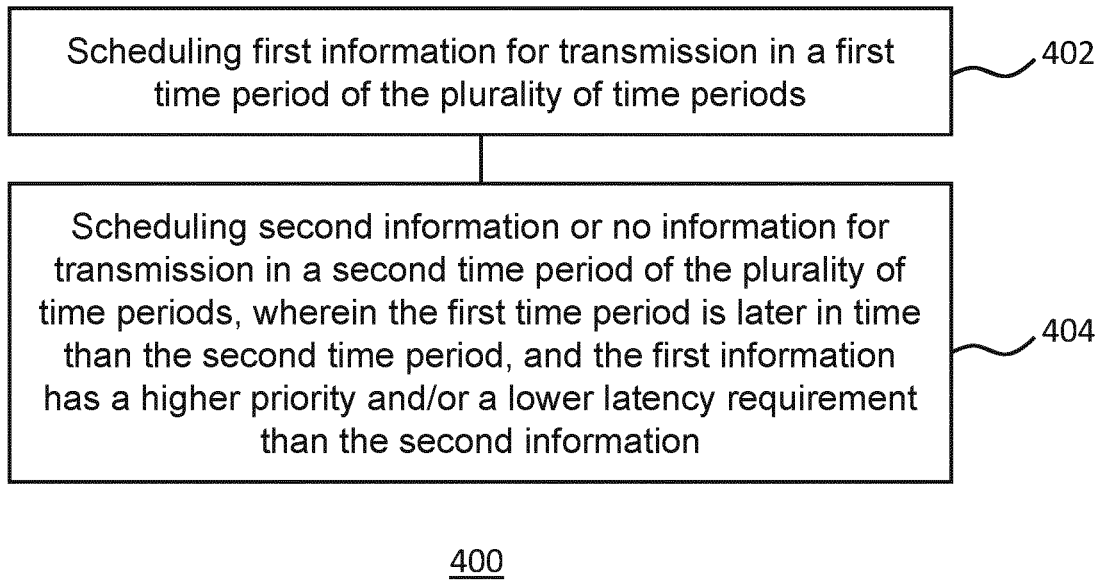
FIG. 4 is a flow chart of an example of a method, performed by a first wireless communications device (e.g. a UE), of scheduling information for transmission in at least one of a plurality of time periods allocated for a transmission occasion of a channel.

FIG. 4 is a flow chart of an example of a method 400, performed by a first wireless communications device (e.g. a UE), of scheduling information for transmission in at least one of a plurality of time periods allocated for a transmission occasion of a channel. The method comprises, in step 402, scheduling first information for transmission in a first time period of the plurality of time periods. The method also comprises, in step 404, scheduling second information or no information for transmission in a second time period of the plurality of time periods, wherein the first time period is later in time than the second time period, and the first information has a higher priority and/or a lower latency requirement than the second information. Thus, as the first information is scheduled for a time period that is not the first or earliest-in-time one or more time periods, the time period in which the first information is scheduled for transmission may for example be less likely to suffer from a listen before talk (LBT) failure and hence may be more likely to be transmitted in that time period, compared to if the first information is scheduled in one of the first (earliest-in-time) one or more time periods allocated or granted for that transmission occasion. Therefore, even though this information is transmitted in a later time period that could otherwise be chosen, which may appear to increase latency, the overall latency and/or reliability may be improved as a result of more reliable transmission and hence a reduction in the need for retransmissions.

In some examples, the first time period is in a later half of the plurality of time periods. For example, the first time period may be a latest-in-time time period of the plurality of time periods. In some examples, the later half of the time periods (e.g. the latest-in-time time period) may be the least likely to be blocked due to LBT or CCA failures.

The first time period may be no later than a predetermined time period of the plurality of time periods.

The information for transmission may comprise a plurality of information portions including the first information and the second information, each information portion associated with a respective priority and/or latency, and the method may comprise scheduling the information portions for transmission in the plurality of time periods in order of increasing priority and/or decreasing latency requirement. That is, the lower priority and/or higher latency requirement portions may be schedule or arranged for transmission before portions with lower latency requirement and/or higher priority, as the portions arranged or scheduled for transmission earlier may in some examples be more likely to be prevented from transmission due to CCA or LBT failures.

In some examples, the method 400 may further comprise receiving an indication of the first time period. Alternatively, the method 400 may comprise receiving an indication of a subset of the plurality of time periods, wherein the subset of the plurality of time periods includes the first time period. The indication may for example be received in RRC signaling, a MAC CE or DCI.

The method 400 may comprise, in some examples, receiving an uplink grant of the plurality of time periods allocated for a transmission occasion of a channel. The method 400 may comprise transmitting the first information in the first time period, and/or transmitting the second information in the second time period.

Each of the plurality of time periods may in some examples comprise a respective one of a transmission time interval, TTI, a time slot, and a mini-slot. For example, the plurality of time periods may include a plurality of mini-slots, and the first time period is a latest-in-time mini-slot of the plurality of mini-slots. Each of the plurality of time periods may comprise a respective number of OFDM symbol durations.

The plurality of time periods may comprise for example a plurality of consecutive and/or contiguous time periods. Alternatively, the plurality of time periods may in some examples comprise a plurality of discontinuous time periods (e.g. separated in time with a gap therebetween). In some examples, some of the plurality of time periods may be consecutive and/or contiguous, and may be discontinuous with one or more other time periods.

The first information may comprise or include for example one or more of a Radio Resource Control, RRC, signaling, Logical Channel, LCH, with high priority level and/or short latency requirement, Ultra Reliable Low Latency Communications, URLLC, data, high priority Media Access Control, MAC, Control Element, CE, Buffer Status Report, BSR, MAC CE, Power Headroom Report, PHR, MAC CE, Cell Radio Network Temporary Identifier, C-RNTI, MAC CE, Uplink Control Information, UCI, and/or Channel State Information, CSI.

The transmissions by the network node (e.g. the wireless device or UE) may comprise PUSCH transmissions. The first information and the second information may for example be transmitted to a base station.

Particular example embodiments will now be described. At least some of these example embodiments may be described referring to particular technologies, e.g. NR, and/or between certain wireless communication devices, e.g. for uplink (UL) transmissions from a UE to a gNB. However, these examples may be applied using different technologies and/or between different devices where appropriate, including for downlink (DL) transmissions in some examples. Additionally or alternatively, transmissions may be performed in unlicensed or licensed spectrum. Also, where TTIs, slots and mini-slots are referred to, these may alternatively be interpreted as non-limiting examples of time periods (and thus a slot may be interpreted as alternatively being a time period, a TTI, a mini-slot, or some other time period).

Furthermore, at least some of these specific examples refer to multi-TTI grant, though can be applied to the generic case of a plurality of time periods allocated for a transmission occasion of a channel (e.g. PUSCH) by the first wireless communication device to a second wireless communication device. Where a multi-TTI grant is indicated, this may be interpreted alternatively as being a transmission occasion grant, e.g. grant or allocation of the plurality of time periods for the transmission occasion of the channel.

Each time period may comprise for example a TTI, slot or mini-slot. In some examples, a TTI may correspond to the Transport block (TB) length. Each TTI may in some examples use a different HARQ process ID. Maximum TTI length may in some examples be one slot, but may be shorter (e.g. a "mini-slot").

In some examples, a multi-TTI may comprise multiple time periods for a physical channel, scheduled with a single grant. In some examples this may be referred to alternatively as multi-slot (which may include slots and/or mini-slots).

A mini-slot may comprise a time period that is shorter than a slot. Multiple mini-slots may be included within a single slot in some examples. The transmissions may have a length of e.g. 7 OFDM symbols or less, e.g. 1,2,3,4,5,6,7 symbols in length. Where a slot has a length of e.g. 14 OFDM symbols, a mini-slot may have a length of any number of symbols less than 14. In some examples, a mini-slot may comprise half a slot, and may align to slot boundaries, i.e. a slot may contain two mini-slots.

In some embodiments, each time period for the transmission occasion may have the same length or may vary in length. For example, the time periods may include a mix of mini-slots and full slots. Therefore, in such examples, some of the time periods are longer (in symbol length) than others: some may be "short" (e.g. less than 14 symbols, such as 7 symbols), and some may occupy the full available length of slot (e.g. 14 symbols in length).

Additional specific example embodiments will now be described. The below embodiments are described in the context of NR unlicensed spectrum (NR-U). However, the examples in this disclosure are not limited to NR-U scenarios. They are also applicable to other unlicensed operation scenarios such as LTE LAA/eLAA/feLAA, or licensed spectrum scenarios.

In one such example embodiment, while receiving a transmission occasion (e.g. multi-TTI) grant, the UE doesn't transmit or schedule for transmission UL data with critical QoS requirements such as RRC signaling, LCHs with high priority levels, URLLC data, high priority MAC CE (BSR MAC CE, PHR MAC CE, C-RNTI MAC CE etc), UCI, in time slots or TBs corresponding to earlier slots/mini-slots of the multi-TTI period. Instead, the UE includes those critical UL data in later slots/mini-slots within the multi-TTI period.

If a QoS requirement (if any) allows it, critical UL data may be included in the last time period or TTI (a slot or a mini-slot) of the multi-TTI period.

If the UE receives a Multi-TTI grant with mix of time period sizes, for example a mix of mini-slots and slots, if QoS requirement (if any) allows it, critical UL data may be included for example in the last mini-slot of the multi-TTI period.

The gNB might configure a particular time period/slot/occasion within the multi-TTI period for any critical information, indicating that the critical information should be transmitted (e.g. by the UE) in that slot, no earlier than that slot, and./or no later than that slot. The configuration may be signaled in an RRC signaling, a MAC CE, or a DCI. In other examples, the gNB may indicate a subset of one or more time slots of the plurality in which the critical information (e.g. first information) should be scheduled or transmitted.

Figure 5:
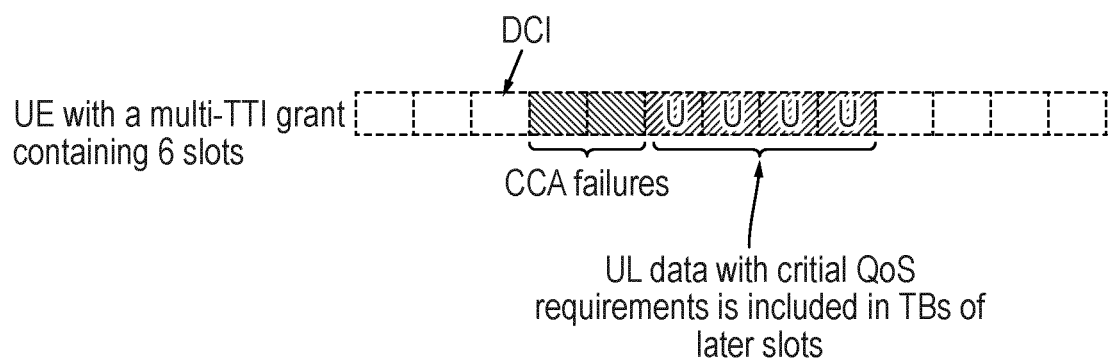
FIG. 5 shows example embodiment in which critical uplink (UL) data is transmitted in a later slot (e.g. not the first one or more slots) within a multi-TTI period.

FIG. 5 illustrates an example in which critical uplink (UL) data is transmitted in a later slot (e.g. not the first one or more slots) within a multi-TTI period.

In other examples, the logical channel priority (LCP) procedure in the UE MAC layer may consider an additional restriction metric concerning whether each logical channel is allowed to be transmitted later e.g. than a first available time period based on priority. In such a way, for example, in addition to existing mapping restrictions such as one or more of allowedSCS-List, maxPUSCH-Duration, configuredGrantType1Allowed, and allowedServingCells, additional information of whether a LCH can be included in a later slot is also considered in the LCP procedure, so that it is only a subset of logical channels without critical QoS requirements with data available are selected for data multiplexing for earlier slots (e.g. earliest one or more slots), while other critical data is transmitted in a later slot when the UE has already obtained the channel.

For example, in the LCP procedure, RRC additionally controls the LCP procedure by configuring mapping restrictions for each logical channel. Besides the existing mapping restrictions, an additional restriction may be considered, e.g. named allowedSlot-LIstWithMultiTTIGrant, which configures the one or more relative slot indices within a multi-TTI period that allowed for scheduling or transmission of the associated logical channel.

In accordance with this example, the MAC entity may, when a new transmission is performed:
1> select the logical channels for each UL grant that satisfy not only existing conditions such as:
2> the set of allowed Subcarrier Spacing index values in allowedSCS-List, if configured, includes the Subcarrier Spacing index associated to the UL grant; and
2> maxPUSCH-Duration, if configured, is larger than or equal to the PUSCH transmission duration associated to the UL grant; and
2> configuredGrantType1Allowed, if configured, is set to TRUE in case the UL grant is a Configured Grant Type 1; and
2> allowedServingCells, if configured, includes the Cell information associated to the UL grant.
An additional condition:
2> allowedSlot-LlstWithMultiTTlGrant, if configured, includes the slot index associated with the grant.
The "allowedSlot-LlstWithMultiTTlGrant" is configured for each logical channel by RRC.

In a further example, upon receiving a grant from the power headroom (PHR) layer within a multi-TTI period, the UE MAC entity may not generate high priority MAC CEs such as:
C-RNTI MAC CE;
Configured Grant Confirmation MAC CE;
MAC CE for BSR, with exception of BSR included for padding;
Single Entry PHR MAC CE or Multiple Entry PHR MAC CE;
for the MAC PDU associated with the received grant when PHY layer indicates that the slot associated with the grant belongs to the first half period of the multi-TTI period, which means that the UE may have higher probability to experience LBT failures.

While the UE MAC entity may generate high priority MAC CEs such as:
C-RNTI MAC CE;
Configured Grant Confirmation MAC CE;
MAC CE for BSR, with exception of BSR included for padding;
Single Entry PHR MAC CE or Multiple Entry PHR MAC CE;
for the MAC PDU associated with the received grant when PHY layer indicates that the slot associated with the grant belongs to the second half period of the multi-TTI period, which means that the UE may have higher probability of a LBT success in or before this slot, and obtain the channel for data transmission.

In another example, upon receiving a multi-TTI grant, the UE MAC may be configured to perform a LCP procedure to build a MAC PDU for every slot/mini-slot in a decreasing order of slot index. In other words, for example the MAC PDU is first built for the last slot/mini-slot (effectively this may mean for example that information may be scheduled in the time slots in order of increasing priority). The LCP and the MAC PDU building (i.e. selection of a time slot for scheduling information for transmission) for the first slot may therefore in some examples be performed at the end of the procedure. In this way, for example, information with critical QoS requirements (such as for example RRC signaling, LCHs with high priority levels, URLLC data, high priority MAC CE, BSR MAC CE, PHR MAC CE, C-RNTI MAC CE and/or UCI) may be included in later slots, while lower priority and/or higher latency requirement information may be included in earlier slots.

In another example, the UE may follow an LCP procedure to prepare MAC PDUs for every slot/mini-slots, upon receiving a multi-TTI grant prior to transmissions. In addition, UL data with critical QoS requirements (such as e.g. RRC signaling, LCHs with high priority levels, URLLC data, high priority MAC CE, BSR MAC CE, PHR MAC CE, C-RNTI MAC CE and/or UCI) may be duplicated in multiple MAC PDUs. In this way, at least one duplicate may be transmitted in time when the UE has obtained the channel after success of LBT operation. The duplication function is configured by the gNB. The configuration may be signaled in an RRC signaling, a MAC CE, or a DCI.

Figure 6:
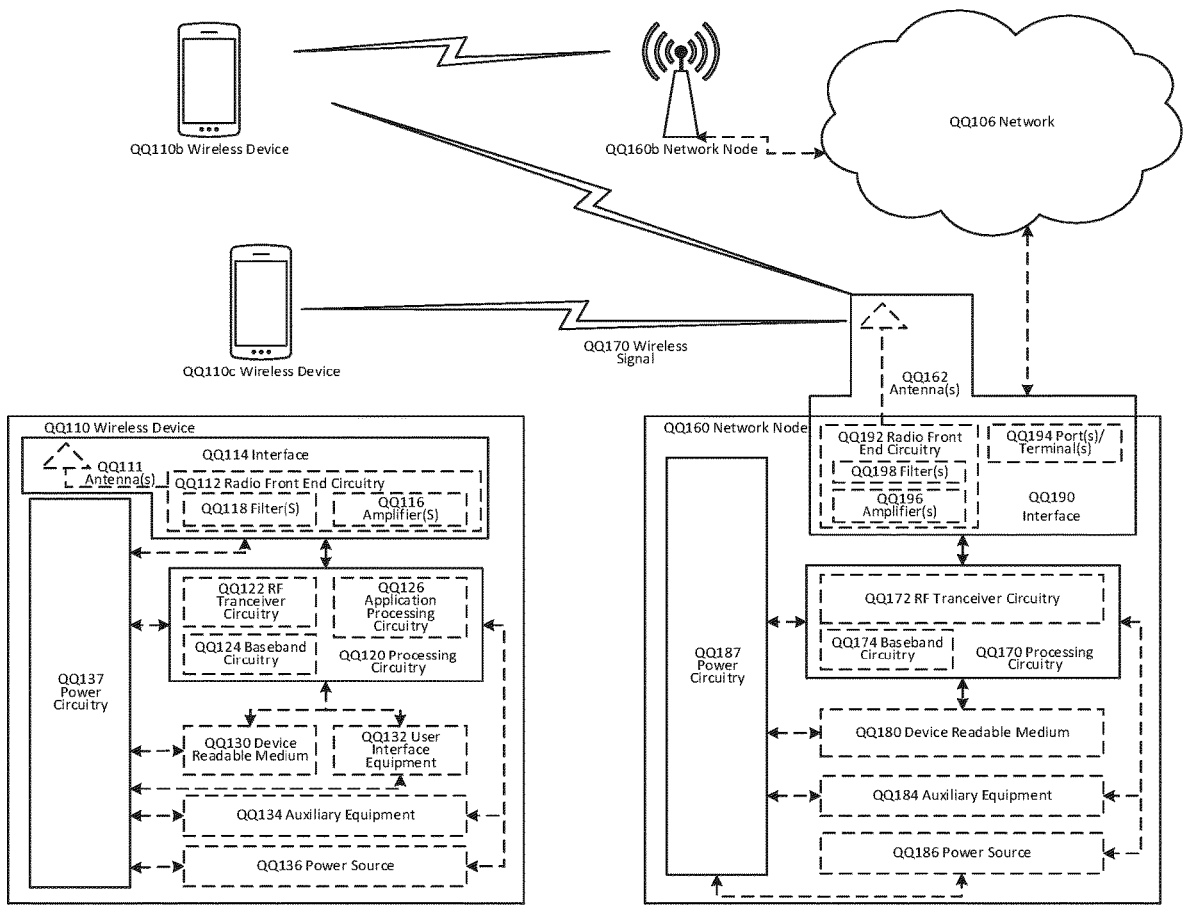
FIG. 6 shows an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB, gNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 6 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 7:
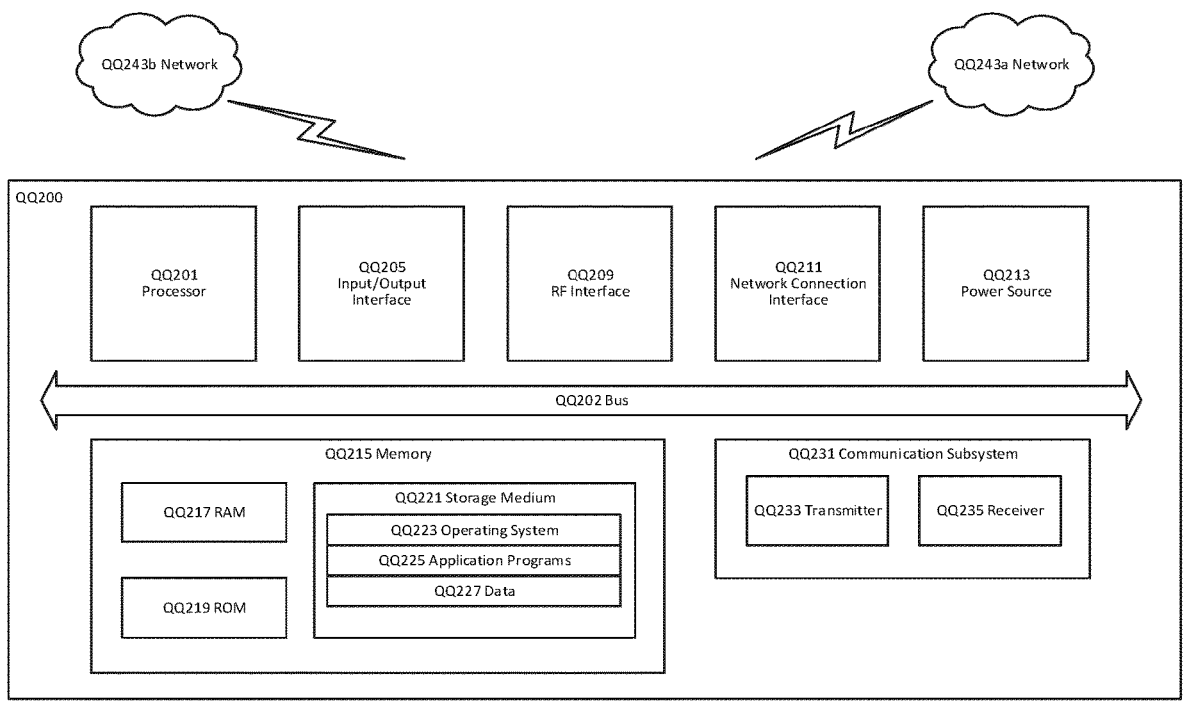
FIG. 7 shows an example of a User Equipment (UE) in accordance with some embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 7, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 8:
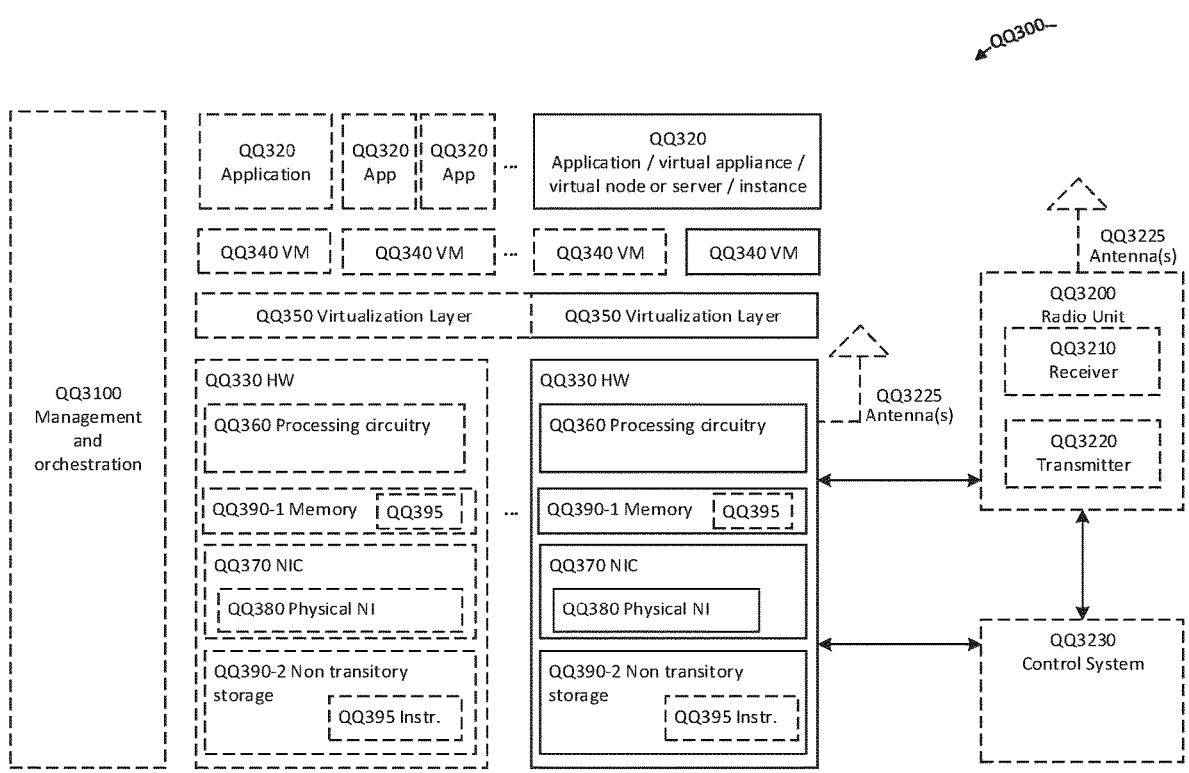
FIG. 8 is a schematic block diagram illustrating a virtualization environment in accordance with some embodiments.

FIG. 8 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 8, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 8.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 9:
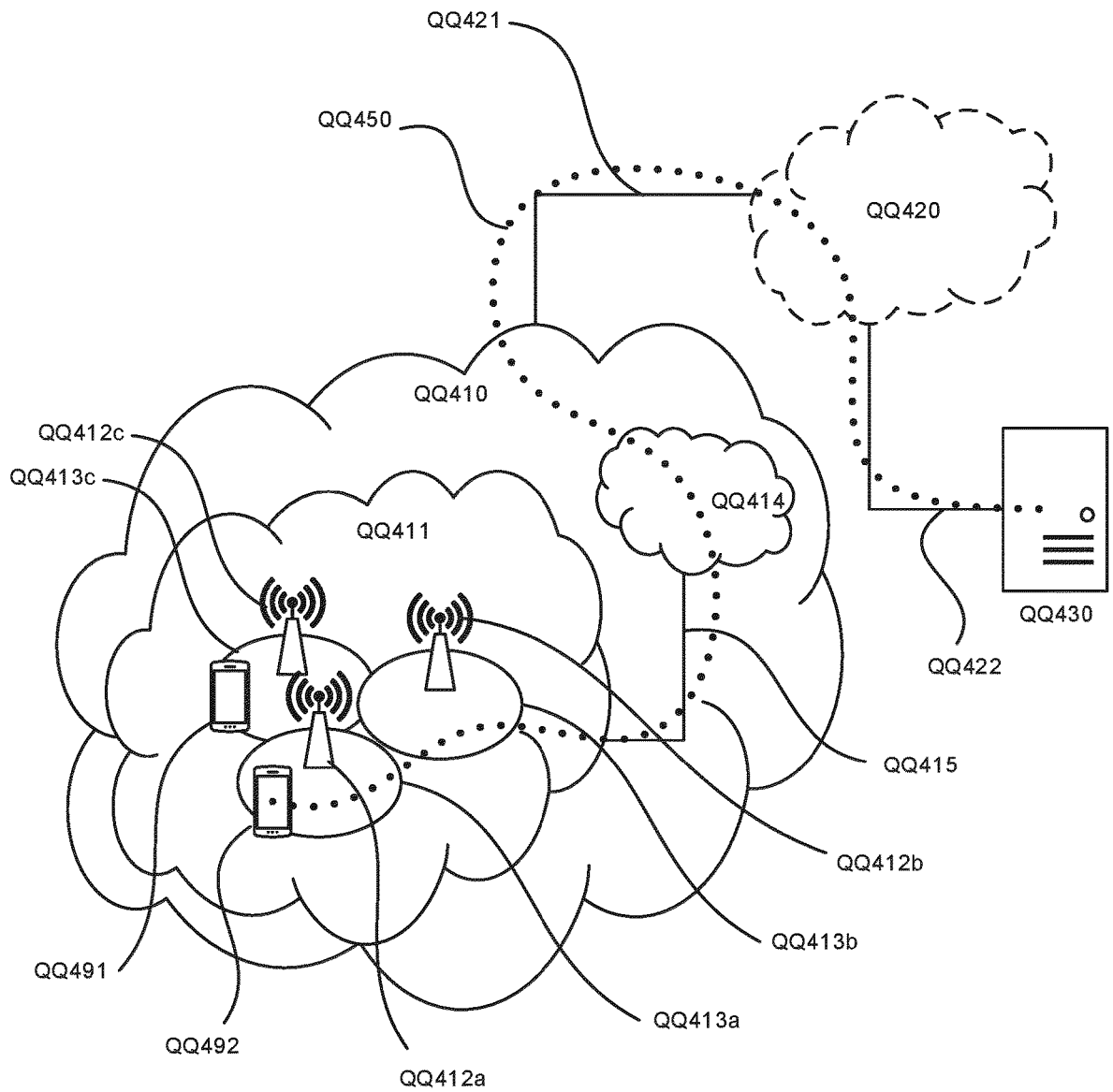
FIG. 9 shows a telecommunication network connected via an intermediate network to a host computer in accordance with some embodiments.

With reference to FIG. 9 in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 9 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 10. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 10) served by base station QQ520. Communication interface QQ526 may be configured to facilitate connection QQ560 to host computer QQ510. Connection QQ560 may be direct or it may pass through a core network (not shown in FIG. 10) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 10:
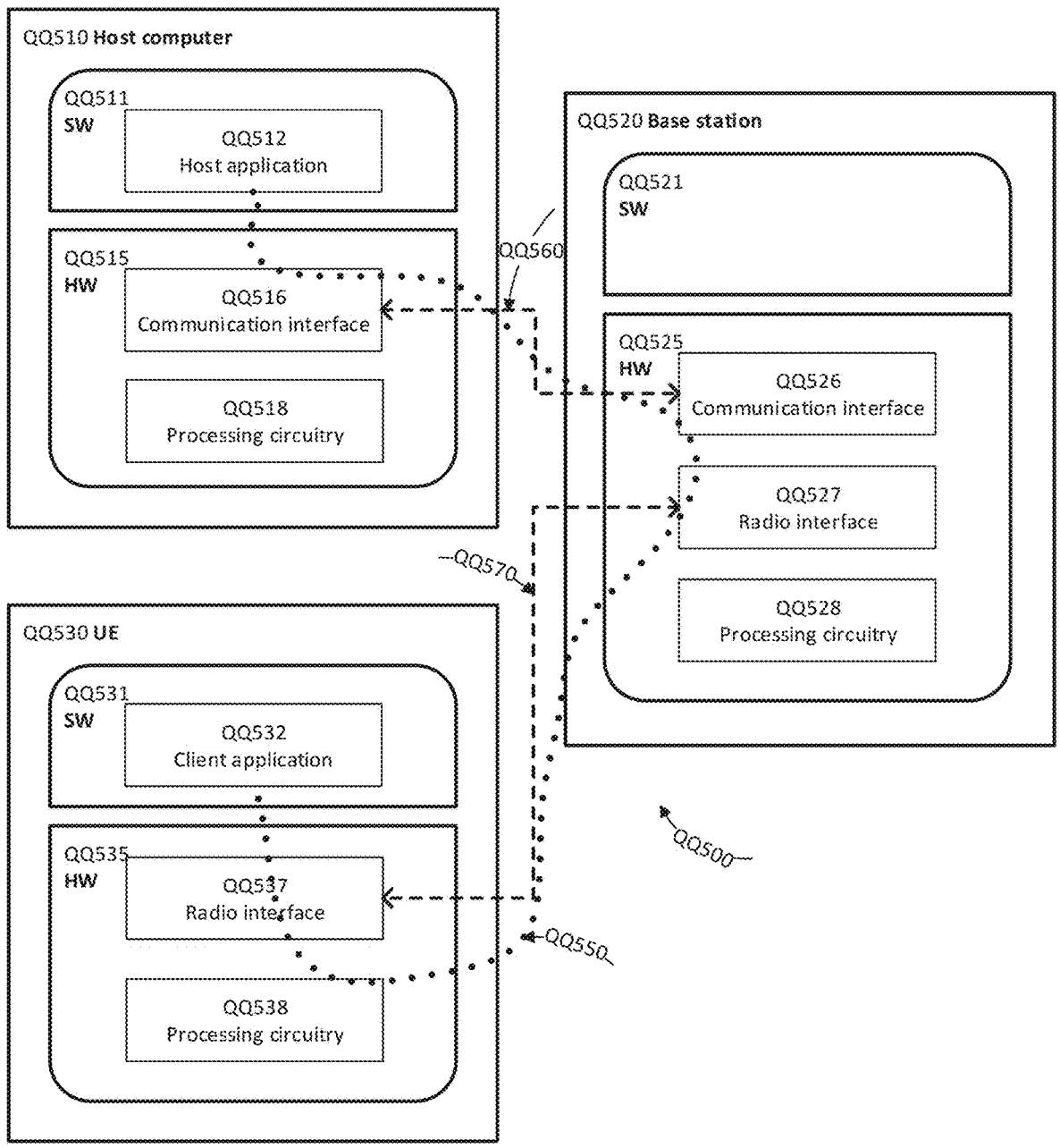
FIG. 10 shows a host computer communicating via a base station with a user equipment over a partially wireless connection in accordance with some embodiments.

It is noted that host computer QQ510, base station QQ520 and UE QQ530 illustrated in FIG. 10 may be similar or identical to host computer QQ430, one of base stations QQ412a, QQ412b, QQ412c and one of UEs QQ491, QQ492 of FIG. 9, respectively. This is to say, the inner workings of these entities may be as shown in FIG. 10 and independently, the surrounding network topology may be that of FIG. 9.

In FIG. 10, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the signaling efficiency and thereby provide benefits such as improved battery life, improved network efficiency etc.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 11:
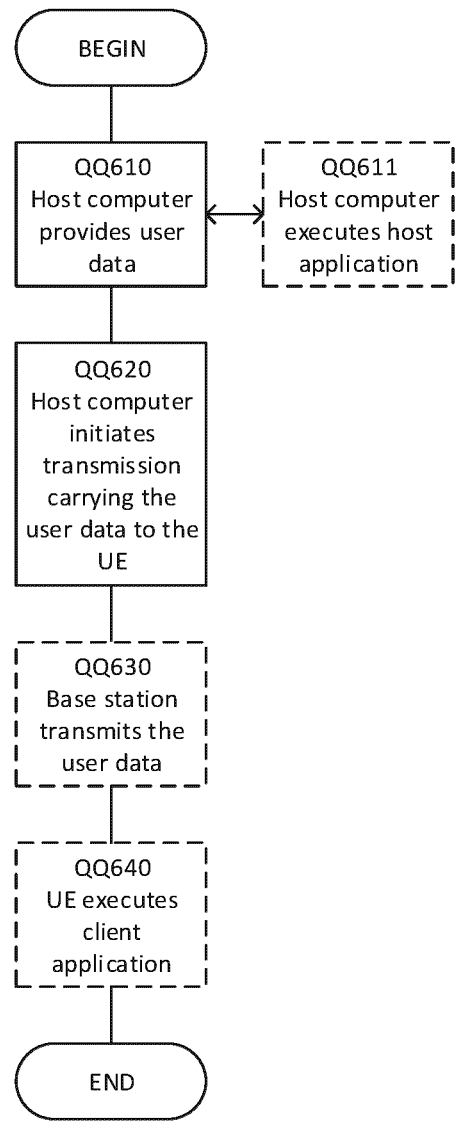
FIG. 11 shows methods implemented in a communication system in accordance with some embodiments.

FIG. 11 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 11 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 12:
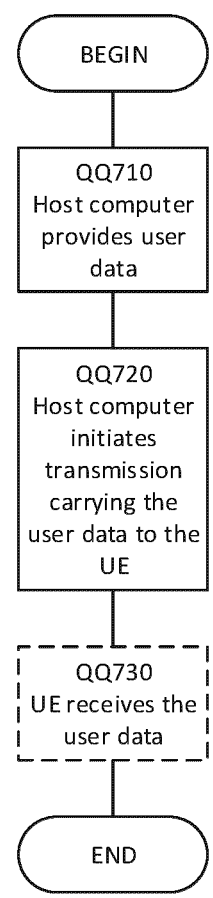
FIG. 12 shows methods implemented in a communication system in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 13:
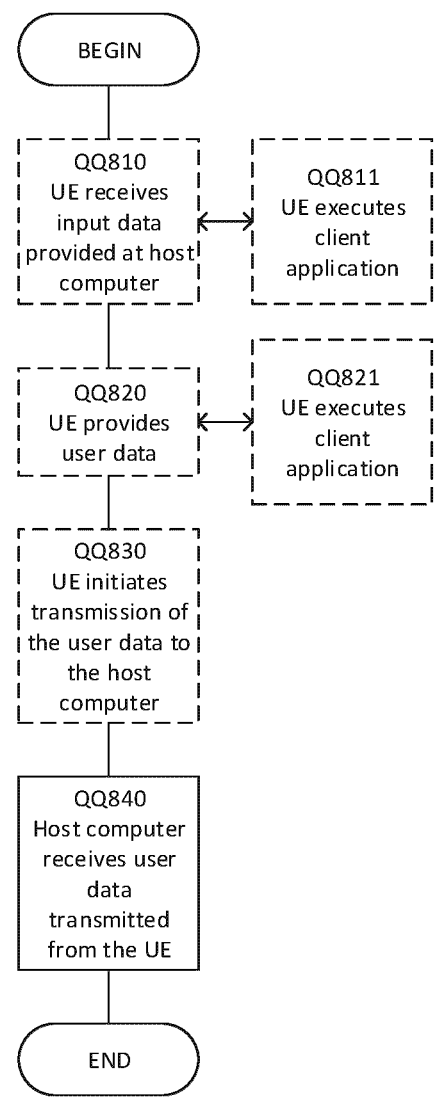
FIG. 13 shows methods implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 14:
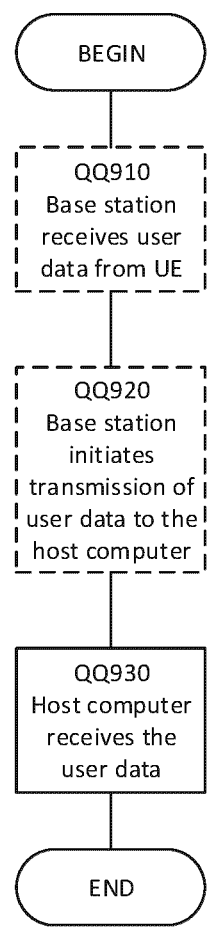
FIG. 14 shows methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Figure 15:
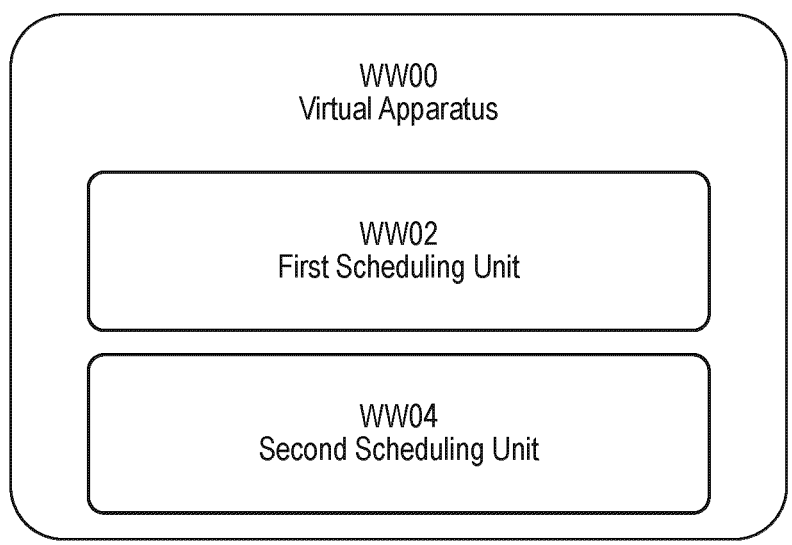
FIG. 15 illustrates a schematic block diagram of virtualization apparatus in accordance with some embodiments.

FIG. 15 illustrates a schematic block diagram of an apparatus WW00 in a wireless network (for example, the wireless network shown in FIG. 6). The apparatus may be implemented in a wireless device or network node (e.g., wireless device QQ110 or network node QQ160 shown in FIG. 6). Apparatus WW00 is operable to carry out the example method described with reference to FIG. 4 and possibly any other processes or methods disclosed herein. It is also to be understood that the method of FIG. 4 is not necessarily carried out solely by apparatus WW00. At least some operations of the method can be performed by one or more other entities.

Virtual Apparatus WW00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first scheduling unit WW02, second scheduling unit WW04 and/or any other suitable units of apparatus WW00 to perform corresponding functions according one or more embodiments of the present disclosure.

Virtual apparatus WW00 may be configured with a list of at least one configuration, each of the at least one configuration associated with a respective conditional mobility procedure and a respective potential target cell.

As illustrated in FIG. 15, apparatus WW00 includes first scheduling unit WW02 and second scheduling unit WW04. First scheduling unit WW02 is configured to schedule first information for transmission in a first time period of the plurality of time periods. Second scheduling unit WW04 is configured to schedule second information or no information for transmission in a second time period of the plurality of time periods, wherein the first time period is later in time than the second time period, and the first information has a higher priority and/or a lower latency requirement than the second information.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Example embodiments of the present disclosure are provided below.

1. A method performed by a first wireless communications device of scheduling information for transmission in at least one of a plurality of time periods allocated for a transmission occasion of a channel, the method comprising:
   scheduling first information for transmission in a first time period of the plurality of time periods; and
   scheduling second information or no information for transmission in a second time period of the plurality of time periods, wherein the first time period is later in time than the second time period, and the first information has a higher priority and/or a lower latency requirement than the second information.
2. The method of embodiment 1, wherein the first time period is a latest in time period of the plurality of time periods.
3. The method of embodiment 1 or 2, wherein the first time period is in a later half of the plurality of time periods.
4. The method of any of the preceding embodiments, wherein the first time period is no later than a predetermined time period of the plurality of time periods.
5. The method of any of the preceding embodiments, wherein the information for transmission comprises a plurality of information portions including the first information and the second information, each information portion associated with a respective priority and/or latency, and wherein the method comprises scheduling the information portions for transmission in the plurality of time periods in order of increasing priority and/or decreasing latency requirement.
6. The method of any of the preceding embodiments, comprising receiving an indication of the first time period.
7. The method of any of embodiments 1 to 5, comprising receiving an indication of a subset of the plurality of time periods, wherein the subset of the plurality of time periods includes the first time period.
8. The method of embodiment 6 or 7, wherein the indication is received in RRC signaling, a MAC CE or DCI.
9. The method of any of the preceding embodiments, comprising receiving an uplink grant of the plurality of time periods allocated for a transmission occasion of a channel.
10. The method of any of the preceding embodiments, comprising transmitting the first information in the first time period, and/or transmitting the second information in the second time period.
11. The method of any of the preceding embodiments, wherein each of the plurality of time periods comprises a respective one of a transmission time interval (TTI), a time slot, and a mini-slot.
12. The method of embodiment 11, wherein the plurality of time periods include a plurality of mini-slots, and the first time period is a latest in time mini-slot of the plurality of mini-slots.
13. The method of any of the preceding embodiments, wherein each of the plurality of time periods comprises a respective number of OFDM symbol durations.
14. The method of any of the preceding embodiments, wherein the plurality of time periods comprise a plurality of consecutive and/or contiguous time periods.
15. The method of any of embodiments 1 to 13, wherein the plurality of time periods comprise a plurality of discontinuous time periods.
16. The method of any of the preceding embodiments, wherein the first information comprises or includes one or more of a Radio Resource Control (RRC) signaling, Logical Channel (LCH) with high priority level and/or short latency requirement, Ultra Reliable Low Latency Communications (URLLC) data, high priority Media Access Control (MAC) Control Element (CE), Buffer Status Report (BSR) MAC CE, Power Headroom Report (PHR) MAC CE, Cell Radio Network Temporary Identifier (C-RNTI) MAC CE, Uplink Control Information (UCI).
17. The method of any of the preceding embodiments, further comprising:
   providing user data; and
   forwarding the user data to a host computer via the transmission to the base station.
18. The method of any of the preceding embodiments, wherein the transmissions by the first wireless communications device comprise PUSCH transmissions.
19. The method of any of the preceding embodiments, wherein the wireless communications device comprises a wireless device or user equipment.
20. The method of any of the preceding embodiments, wherein the first information and the second information are transmitted to a base station.
21. The method of any of embodiments 1 to 15, wherein the wireless communications device comprises a base station.
22. The method of embodiment 19, wherein the first information and the second information are transmitted to a wireless device or user equipment.
23. A wireless device, the wireless device comprising:
   processing circuitry configured to perform any of the steps of any of embodiments 1-20; and
   power supply circuitry configured to supply power to the wireless device.
24. A base station, the base station comprising:
   processing circuitry configured to perform any of the steps of any of embodiments 1-17 and 21-22;
   power supply circuitry configured to supply power to the base station.
25. A user equipment (UE), the UE comprising:
   an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of embodiments 1-20;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

26. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of embodiments 1-17 and 21-22.

27. The communication system of the previous embodiment further including the base station.

28. The communication system of the previous 2 embodiments, further including the UE, wherein the UE is configured to communicate with the base station.

29. The communication system of the previous 3 embodiments, wherein:

the processing circuitry of the host computer is configured to execute a host application, thereby providing the user data; and the UE comprises processing circuitry configured to execute a client application associated with the host application.

30. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of embodiments 1-17 and 21-22.

31. The method of the previous embodiment, further comprising, at the base station, transmitting the user data.

32. The method of the previous 2 embodiments, wherein the user data is provided at the host computer by executing a host application, the method further comprising, at the UE, executing a client application associated with the host application.

33. A user equipment (UE) configured to communicate with a base station, the UE comprising a radio interface and processing circuitry configured to performs the of the previous 3 embodiments.

34. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of embodiments 1-20.

35. The communication system of the previous embodiment, wherein the cellular network further includes a base station configured to communicate with the UE.

36. The communication system of the previous 2 embodiments, wherein:

the processing circuitry of the host computer is configured to execute a host application, thereby providing the user data; and the UE's processing circuitry is configured to execute a client application associated with the host application.

37. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of embodiments 1-20.

38. The method of the previous embodiment, further comprising at the UE, receiving the user data from the base station.

39. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of embodiments 1-20.

40. The communication system of the previous embodiment, further including the UE.

41. The communication system of the previous 2 embodiments, further including the base station, wherein the base station comprises a radio interface configured to communicate with the UE and a communication interface configured to forward to the host computer the user data carried by a transmission from the UE to the base station.

42. The communication system of the previous 3 embodiments, wherein:

the processing circuitry of the host computer is configured to execute a host application; and the UE's processing circuitry is configured to execute a client application associated with the host application, thereby providing the user data.

43. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

44. A method implemented in a communication system including a host computer, a base station and a user equipment (UE), the method comprising:

at the host computer, receiving user data transmitted to the base station from the UE, wherein the UE performs any of the steps of any of embodiments 1-20.

45. The method of the previous embodiment, further comprising, at the UE, providing the user data to the base station.

46. The method of the previous 2 embodiments, further comprising:
    at the UE, executing a client application, thereby providing the user data to be transmitted; and
    at the host computer, executing a host application associated with the client application.

47. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.

48. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of embodiments 1-17 and 21-22.

49. The communication system of the previous embodiment further including the base station.

50. The communication system of the previous 2 embodiments, further including the UE, wherein the UE is configured to communicate with the base station.

51. The communication system of the previous 3 embodiments, wherein:
    the processing circuitry of the host computer is configured to execute a host application;
    the UE is configured to execute a client application associated with the host application, thereby providing the user data to be received by the host computer.

52. A method implemented in a communication system including a host computer, a base station and a user equipment (UE), the method comprising:
    at the host computer, receiving, from the base station, user data originating from a transmission which the base station has received from the UE, wherein the UE performs any of the steps of any of embodiments 1-20.

53. The method of the previous embodiment, further comprising at the base station, receiving the user data from the UE Abbreviations At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
AM Acknowledged Mode
CHO Conditional Handover
DCCH Dedicated Control Channel
E-UTRA Evolved Universal Terrestrial Radio Access Network
HO Handover
IE Information Element
LTE Long Term Evolution
MAC Medium Access Control
NR New Radio
PCI Physical Cell Identity
RAT Radio Access Technology
RB Radio Bearer
RLC Radio Link Control
RRC Radio Resource Control
SAP Service Access Point
SRB Signaling Radio Bearer
TS Technical Specification
UE User Equipment (used interchangeably with wireless device)
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless communications device of scheduling information for transmission in at least one of a plurality of time periods allocated for a transmission occasion of a channel, the method comprising:
scheduling first information for transmission in a first time period of the plurality of time periods; and
scheduling second information or no information for transmission in a second time period of the plurality of time periods, wherein the first time period is later in time than the second time period, and the first information has at least one of the following:
a higher priority than the second information; and
a requirement of lower latency than the second information,
wherein the information for transmission comprises a plurality of information portions including the first information and the second information, each information portion associated with at least one of a respective priority and latency, and
wherein the method comprises scheduling the information portions for transmission in the plurality of time periods in order of at least one of increasing priority and decreasing latency requirement.

2. The method of claim 1, wherein the first time period is a latest-in-time time period of the plurality of time periods.

3. The method of claim 1, wherein the first time period is in a later half of the plurality of time periods.

4. The method of claim 1, wherein the first time period is no later than a predetermined time period of the plurality of time periods.

5. The method of claim 1, comprising receiving an indication of the first time period.

6. The method of claim 5, wherein the indication is received in Radio Resource Control (RRC) signalling, a Medium Access Control (MAC) Control Element (CE), or Downlink Control Information (DCI).

7. The method of claim 1, comprising receiving an indication of a subset of the plurality of time periods, wherein the subset of the plurality of time periods includes the first time period.

8. The method of claim 1, comprising receiving an uplink grant of the plurality of time periods allocated for a transmission occasion of a channel.

9. The method of claim 8, wherein the uplink grant is a multi-transmission time interval grant for physical uplink shared channels (PUSCHs).

10. The method of claim 1, comprising at least one of the following:
transmitting the first information in the first time period, and
transmitting the second information in the second time period.

11. The method of claim 10, wherein the transmissions are PUSCH transmissions.

12. The method of claim 10, wherein the first information and the second information are transmitted to a base station.

13. The method of claim 1, wherein each of the plurality of time periods comprises a respective one of a transmission time interval (TTI), a time slot, and a mini-slot.

14. The method of claim 1, wherein the plurality of time periods comprises a plurality of consecutive and/or contiguous time periods.

15. The method of claim 1, wherein the plurality of time periods comprises a plurality of discontinuous time periods.

16. The method of claim 1, wherein the first information comprises or includes one or more of a Radio Resource Control (RRC) signalling, Logical Channel (LCH) with at least one of a high priority level and a requirement of short latency, Ultra Reliable Low Latency Communications (URLLC) data, high priority Media Access Control (MAC) Control Element (CE), Buffer Status Report (BSR) MAC CE, Power Headroom Report (PHR) MAC CE, Cell Radio Network Temporary Identifier (C-RNTI) MAC CE.

17. The method of claim 1, wherein the first information comprises Uplink Control Information (UCI).

18. The method of claim 1, wherein the wireless communications device is a user equipment (UE).

19. A wireless communications device for scheduling information for transmission in at least one of a plurality of time periods allocated for a transmission occasion of a channel, the wireless communications device comprising a processor and a memory, the memory containing instructions executable by the processor such that the wireless communications device is operable to:
  schedule first information for transmission in a first time period of the plurality of time periods; and
  schedule second information or no information for transmission in a second time period of the plurality of time periods, wherein the first time period is later in time than the second time period, and the first information has at least one of the following:
    a higher priority than the second information; and
    a requirement of a lower latency than the second information,
  wherein the information for transmission comprises a plurality of information portions including the first information and the second information, each information portion associated with at least one of a respective priority and latency, and
  wherein the method comprises scheduling the information portions for transmission in the plurality of time periods in order of at least one of increasing priority and decreasing latency requirement.

* * * * *